(12) United States Patent
Ki

(10) Patent No.: US 9,126,364 B2
(45) Date of Patent: Sep. 8, 2015

(54) PRESS DIE

(71) Applicant: Samsung Electronics Co., Ltd., Suwon-si (KR)

(72) Inventor: Jun Cheol Ki, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/200,927

(22) Filed: Mar. 7, 2014

(65) Prior Publication Data

US 2014/0255532 A1  Sep. 11, 2014

(30) Foreign Application Priority Data

Mar. 8, 2013 (KR) ........................ 10-2013-0024925

(51) Int. Cl.
*B29C 43/04* (2006.01)
*B29C 67/00* (2006.01)
*B21D 5/04* (2006.01)
*B21D 19/08* (2006.01)

(52) U.S. Cl.
CPC .............. *B29C 67/0011* (2013.01); *B21D 5/04* (2013.01); *B21D 19/08* (2013.01); *B21D 19/082* (2013.01)

(58) Field of Classification Search
CPC .................................................. B29C 67/0011
USPC .......... 425/502, 520–521, 390, 397–399, 403
See application file for complete search history.

(56) References Cited

U.S. PATENT DOCUMENTS

| 5,599,565 A | * | 2/1997 | Dittlo | 425/384 |
| 5,816,991 A | * | 10/1998 | Sato | 493/167 |
| 7,429,172 B2 | * | 9/2008 | Chotard | 425/521 |
| 7,699,595 B2 | * | 4/2010 | Spengler | 425/149 |

FOREIGN PATENT DOCUMENTS

| KR | 10-2010-0056092 | 5/2010 |
| KR | 10-2011-0071238 | 6/2011 |

* cited by examiner

*Primary Examiner* — Joseph S Del Sole
*Assistant Examiner* — Thukhanh T Nguyen
(74) *Attorney, Agent, or Firm* — Staas & Halsey LLP

(57) ABSTRACT

A press die is provided which includes a lower die having a lower core and an upper die having an upper core, the upper die includes moving blocks installed movably in a first horizontal direction and a bending shaft installed to the moving blocks, and the bending shaft presses a plate against a side surface forming portion of the lower core as the moving blocks move in the first horizontal direction, thereby enabling the plate to be deformed in the first direction.

12 Claims, 6 Drawing Sheets

PRESS DIE

CROSS-REFERENCE TO RELATED APPLICATIONS

This application claims the priority benefit of Korean Patent Application No. 10-2013-0024925, filed on Mar. 8, 2013 in the Korean Intellectual Property Office, the disclosure of which is incorporated herein by reference.

BACKGROUND

1. Field

Embodiments relate to a press die which deforms a plate by applying pressure to the plate.

2. Description of the Related Art

In general, a press die includes a lower die installed on the ground to load a plate thereon, and an upper die installed movably in a vertical direction.

Accordingly, after a plate is loaded onto a lower core arranged in the lower die, the upper die is moved downwards so that the lower core engages with an upper core of the upper die in a state in which the plate is interposed therebetween, thereby enabling the plate to be deformed.

As described above, since the press die deforms a plate using the vertically movable upper die, the plate is easily deformed in a vertical direction while being difficult to deform in a horizontal direction using such a press die.

SUMMARY

In an aspect of one or more embodiments, there is provided a press die, which includes a lower die and an upper die, capable of deforming a plate in a horizontal direction as well as in a vertical direction.

In an aspect of one or more embodiments, there is provided a press die includes a lower die and an upper die disposed on an upper side of the lower die, wherein the lower die includes a lower base resting on the ground and a lower core on which a plate is loaded, the lower core having a lower surface forming portion corresponding to a lower surface of a product to be manufactured and a side surface forming portion corresponding to a side surface of the product to be manufactured, and the upper die includes an upper base, an upper core which includes an upper surface forming portion corresponding to an upper surface of the product to be manufactured and is vertically movably installed to the upper base, a pair of moving blocks which is horizontally movably installed to the upper base, and a cylindrical bending shaft both end portions of which are installed to the pair of moving blocks, the bending shaft pressing a portion of the plate against the side surface forming portion as the moving blocks move in a first horizontal direction.

The bending shaft may be rotatably installed to the pair of moving blocks.

The upper die may further include an elastic support unit to elastically support each of the pair of moving blocks in the first horizontal direction.

The upper base may include a support member to mount the elastic support unit, and the elastic support unit may include a guide pin one end of which is provided with a head portion and the other end of which passes through the support member to be fixedly mounted to the moving block, and a transfer spring one end of which is supported by the support member and the other end of which is supported by the head portion.

The upper core may include a guide portion which forms a side surface thereof and guides the bending shaft such that the bending shaft moves in a second horizontal direction opposite to the first horizontal direction.

The lower die may include a pair of guide blocks to guide the bending shaft, and each of the guide blocks may include the side surface forming portion and a guide groove having a shape corresponding to the guide portion.

The lower die may include a pair of guide blocks to guide the bending shaft, and each of the guide blocks may include the side surface forming portion and a guide groove having a shape corresponding to the guide portion.

The pair of guide rollers may be installed so as to be able to adjust a fixing position in an axial direction of the bending shaft.

The upper core may include a pair of guide portions which is symmetrically arranged at both sides thereof, the lower core may include a pair of side surface forming portions which is symmetrically arranged at both sides thereof, the pair of moving blocks, the bending shaft, and the elastic support unit may be symmetrically disposed at both sides about the upper core, respectively, and the pair of guide blocks may be symmetrically disposed at both sides about the lower core, respectively.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
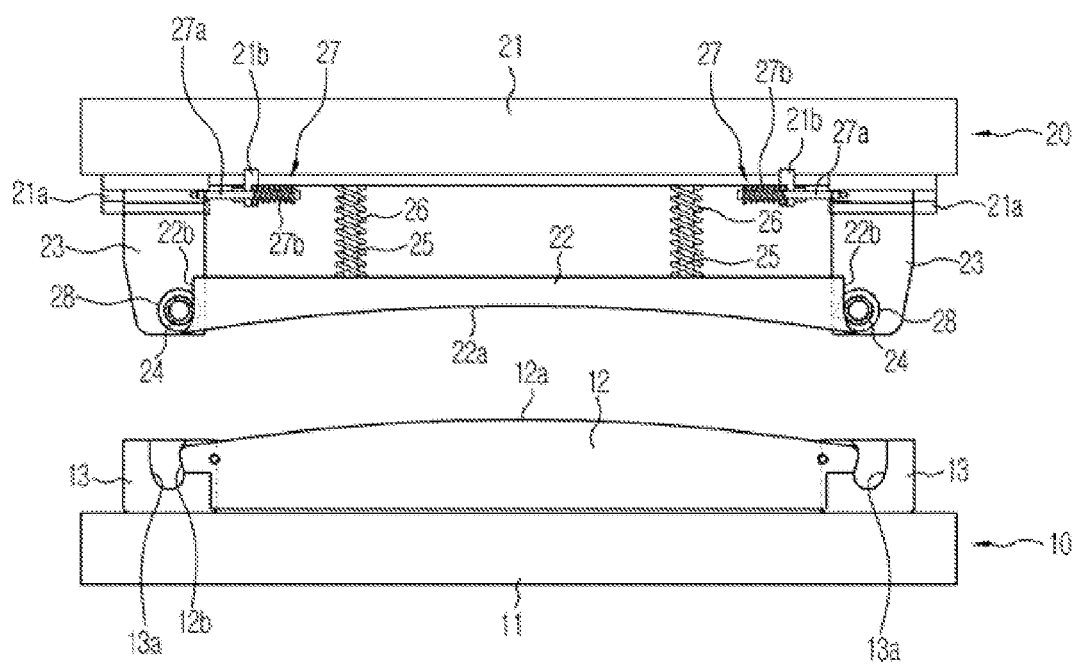
FIG. 1 is a view schematically illustrating a press die according to an embodiment.

Hereinafter, a press die according to an embodiment will be described in detail with reference to the drawings, wherein like reference numerals refer to like elements throughout.

As shown in FIG. 1, a press die according to an embodiment includes a lower die 10 installed on a stationary surface (e.g., the ground), and an upper die 20 which is vertically movably disposed on an upper side of the lower die 10 and is detachably coupled to the lower die 10. After a plate P (see FIG. 2) is loaded onto the lower die 10 in a state in which the lower die 10 and the upper die 20 are separated from each other, the upper die 20 is moved downwards such that the lower die 10 engages with the upper die 20 in a state in which the plate P is interposed therebetween, thereby enabling the plate P to be deformed.

The lower die 10 includes a lower base 11 resting on the ground, and a lower core 12 which is disposed on the lower base 11 and has a shape corresponding to a lower side of a product (article) to be manufactured. The lower core 12 includes a lower surface forming portion 12a which forms an upper surface of the lower core 12 and is arranged to have a shape corresponding to a lower surface of the product to be manufactured, and a side surface forming portion 12b which is provided at a side surface of the lower core 12 and is arranged to have a shape corresponding to a side surface of the product to be manufactured.

The upper die 20 includes an upper base 21 installed movably in a vertical direction, an upper core 22 which is provided on an upper side of the lower core 12 and is vertically movably installed to the upper base 21, a guide rod 25 to guide vertical movement of the upper core 22, and an up-down spring 26 which is disposed around the guide rod 25 so that the upper core 22 is elastically supported by the upper base 21. The upper core 22 includes an upper surface forming portion 22a which forms a lower surface of the upper core 22 and is arranged to have a shape corresponding to an upper surface of the product to be manufactured.

In addition, in order to deform the plate P in a horizontal direction, the upper die 20 includes moving blocks 23 which are horizontally movably installed to the upper base 21, an elastic support unit 27 to elastically support each of the moving blocks 23 in a first horizontal direction, and a bending shaft 24 which is installed to the moving blocks 23 to press and bend both end portions of the plate P toward the side surface forming portion 12b as the moving blocks 23 move in the first horizontal direction such that the plate P is deformed to a shape corresponding to the side surface forming portion 12b.

Furthermore, the upper die 20 includes a rail 21a on which each of the moving blocks 23 is movably installed and a support member 21b to mount the elastic support unit 27.

The elastic support unit 27 includes a guide pin 27a one end of which is provided with a head portion and the other end of which passes through the support member 21b to be fixedly mounted to the moving block 23, and a transfer spring 27b mounted around the guide pin 27a, the transfer spring 27b being supported at one end thereof by the head portion while being supported at the other end thereof by the support member 21b. The transfer spring 27b is mounted so as to elastically support the guide pin 27a in the first horizontal direction so that the moving block 23 installed at the other end of the guide pin 27a is elastically supported by the elastic support unit 27 in the first horizontal direction.

The bending shaft 24 is rotatably installed to the moving blocks 23 to move along the side surface forming portion 12b and a guide portion 22b to be described later while rotating.

The upper die 20 includes a guide portion 22b which obliquely extends downwards from a second horizontal direction to form the side surface of the upper die 20 such that the moving blocks 23 may move in the second horizontal direction opposite to the first horizontal direction.

In addition, the lower die 10 includes a pair of guide blocks 13 which is provided at positions corresponding to both ends of the bending shaft 24 to guide horizontal movement of the bending shaft 24. The pair of guide blocks 13 includes guide grooves 13a corresponding to both end of the bending shaft 24, respectively. Each of the guide grooves 13a is formed in a shape corresponding to the above-mentioned guide portion 22b and side surface forming portion 12b to allow the bending shaft 24 to move along a trajectory corresponding to the guide portion 22b and side surface forming portion 12b.

In addition, in a case of bending both left and right ends of the plate P, a tip portion (a front end or a rear end of the plate on the basis of the drawing) of which is bent, using the press die according to an embodiment, a double bent portion may be generated. In this case, creases may be generated at the double bent portion or the double bent portion may protrude to the outside.

Thus, in order to prevent the above issue, guide rollers 28 are mounted to both ends of the bending shaft 24, respectively. The guide rollers 28 are disposed at the side of the upper die 20 so as to be spaced at an interval corresponding to a thickness of the plate P, and support the side of the double bent portion. In this embodiment, each of the guide rollers 28 may easily correspond to the thickness of the plate P by moving a fixing position of the guide roller in an axial direction of the bending shaft 24 using a screw or the like.

The pair of moving blocks 23, the bending shaft 24, and the elastic support units 27 as described above are symmetrically disposed at both sides about the upper core 22, respectively. The above-mentioned pair of guide blocks 13 is symmetrically disposed at both sides about the lower core 12, respectively.

Hereinafter, an operation of the press die having the above-mentioned configuration will be described with reference to the drawings.

Figure 2:
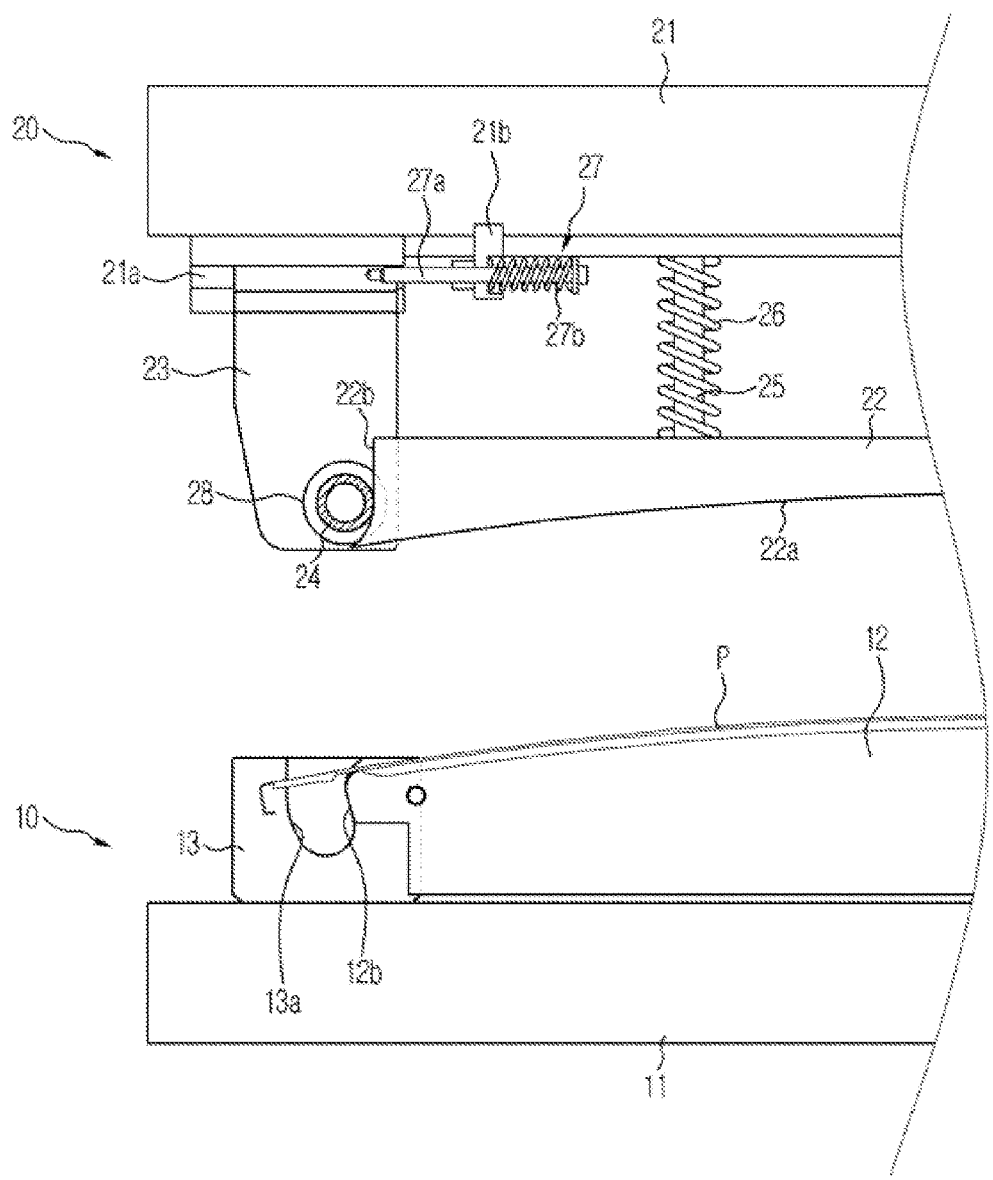
FIGS. 2 to 6 are views schematically illustrating an operation of the press die according to an embodiment.
Figure 3:
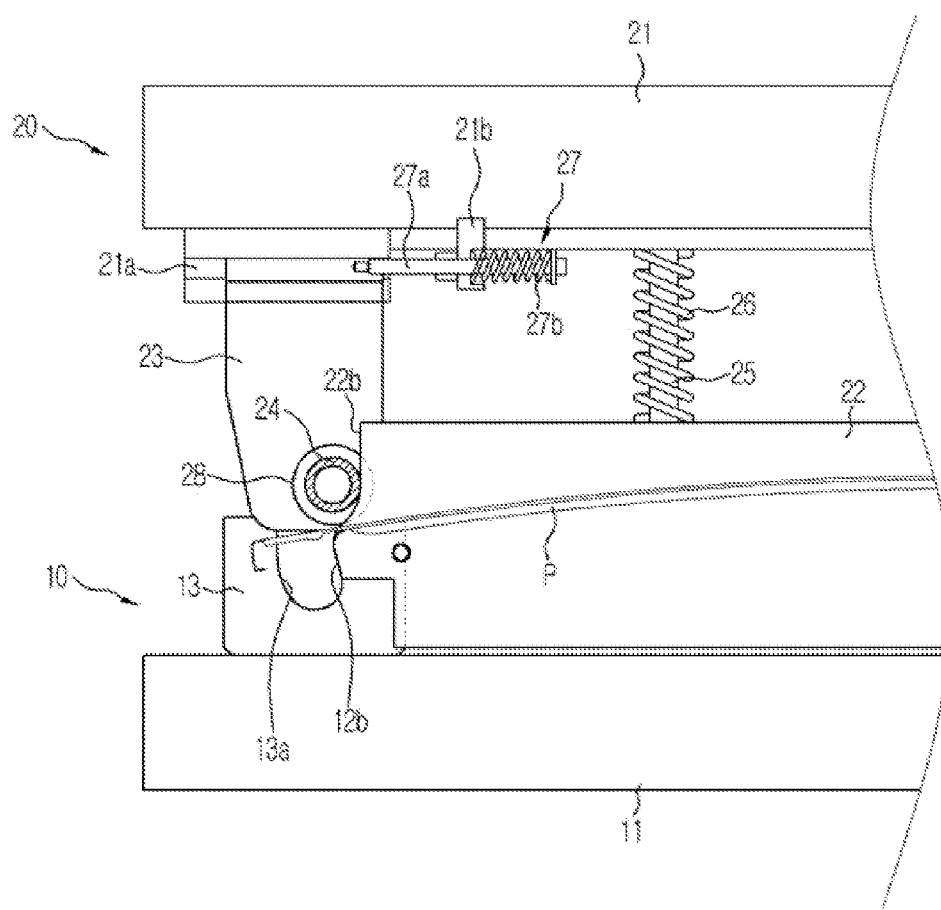
Figure 4:
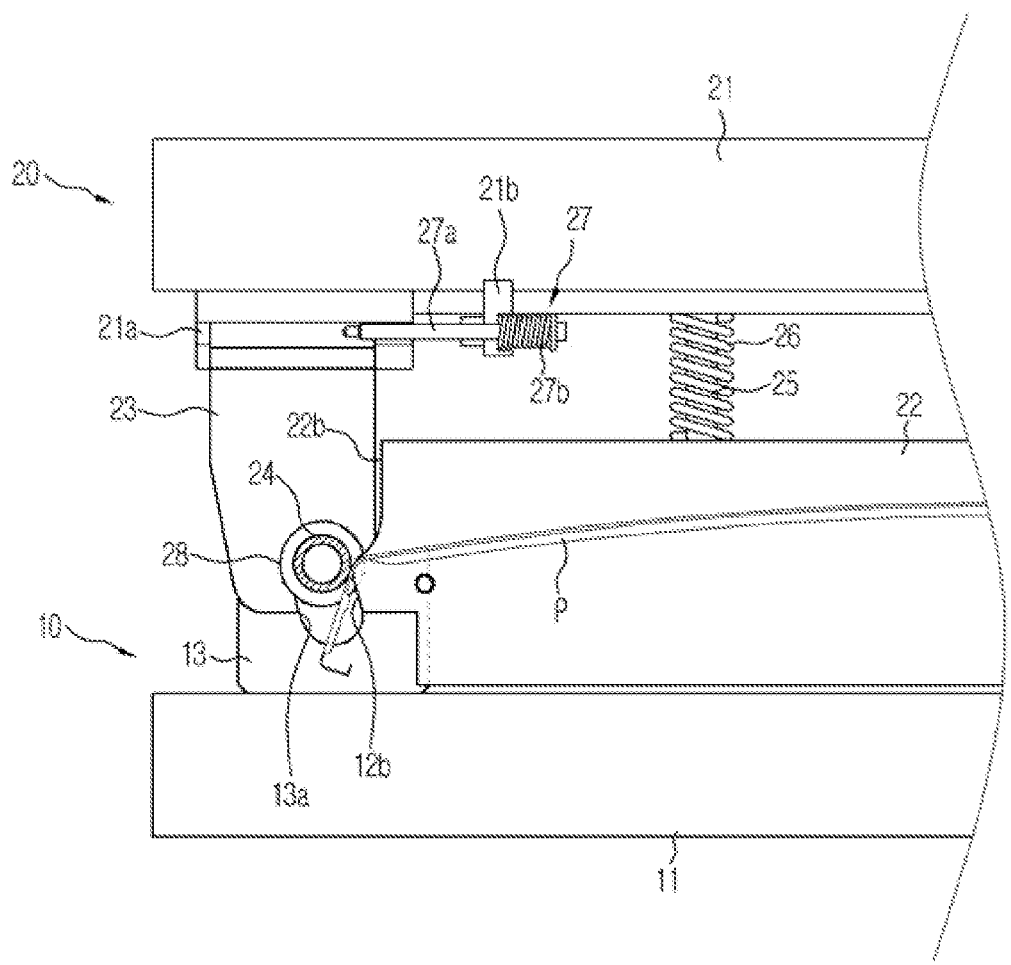

First, when the plate P is loaded onto the lower surface forming portion 12a of the lower core 12 as shown in FIG. 2 and the upper die 20 is then moved downwards as shown in FIG. 3, the upper surface forming portion 22a of the upper core 22 shown in FIG. 4 is supported by the upper surface of the plate P depending on the downward movement of the upper die 20 so that the central side of the plate P is deformed to a shape corresponding to the lower surface forming portion 12a and the upper surface forming portion 22a.

Figure 5:
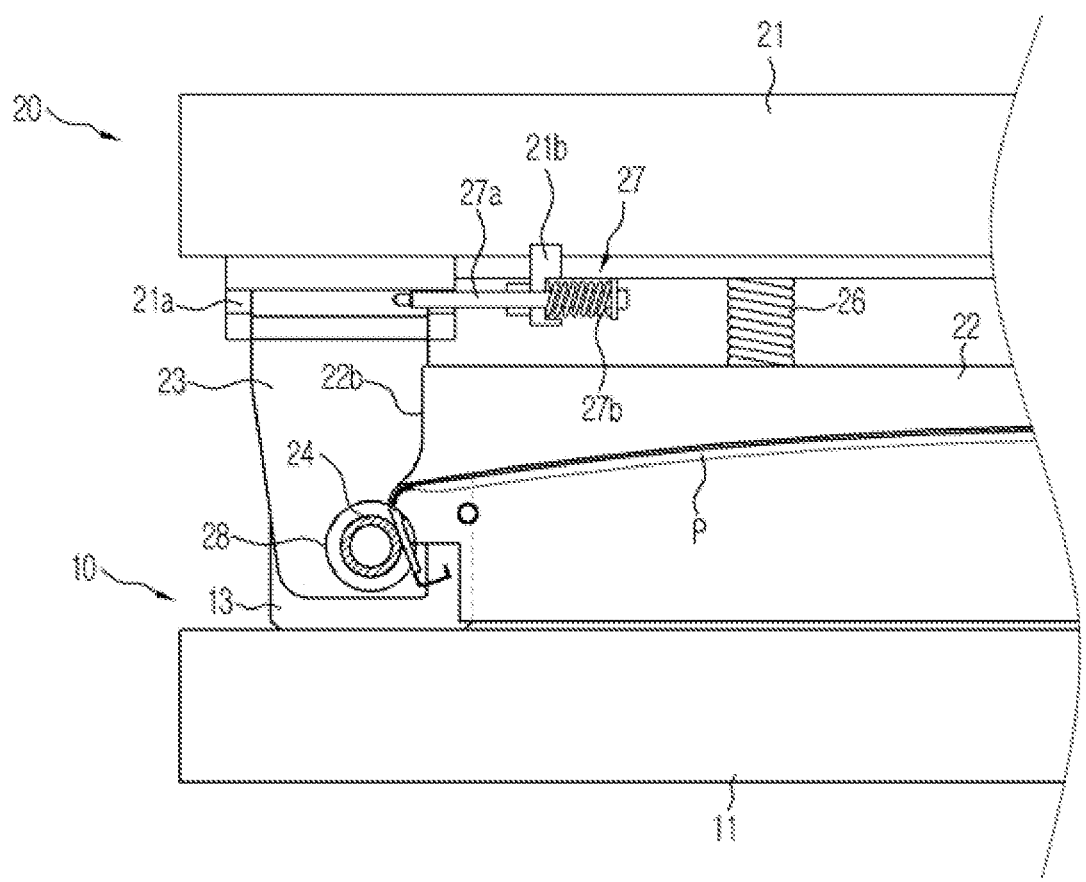

The movement of the upper core 22 is stopped after the upper surface forming portion 22a is supported by the upper surface of the plate P. Then, the moving block 23 and the bending shaft 24 installed to the moving block 23 are moved downwards as shown in FIG. 5. In this case, since the bending shaft 24 is moved along the guide portion 22b, the bending shaft 24 is moved downwards while moving in the second horizontal direction. Accordingly, the tip portion of the plate P is deformed downwards by the bending shaft 24.

Figure 6:
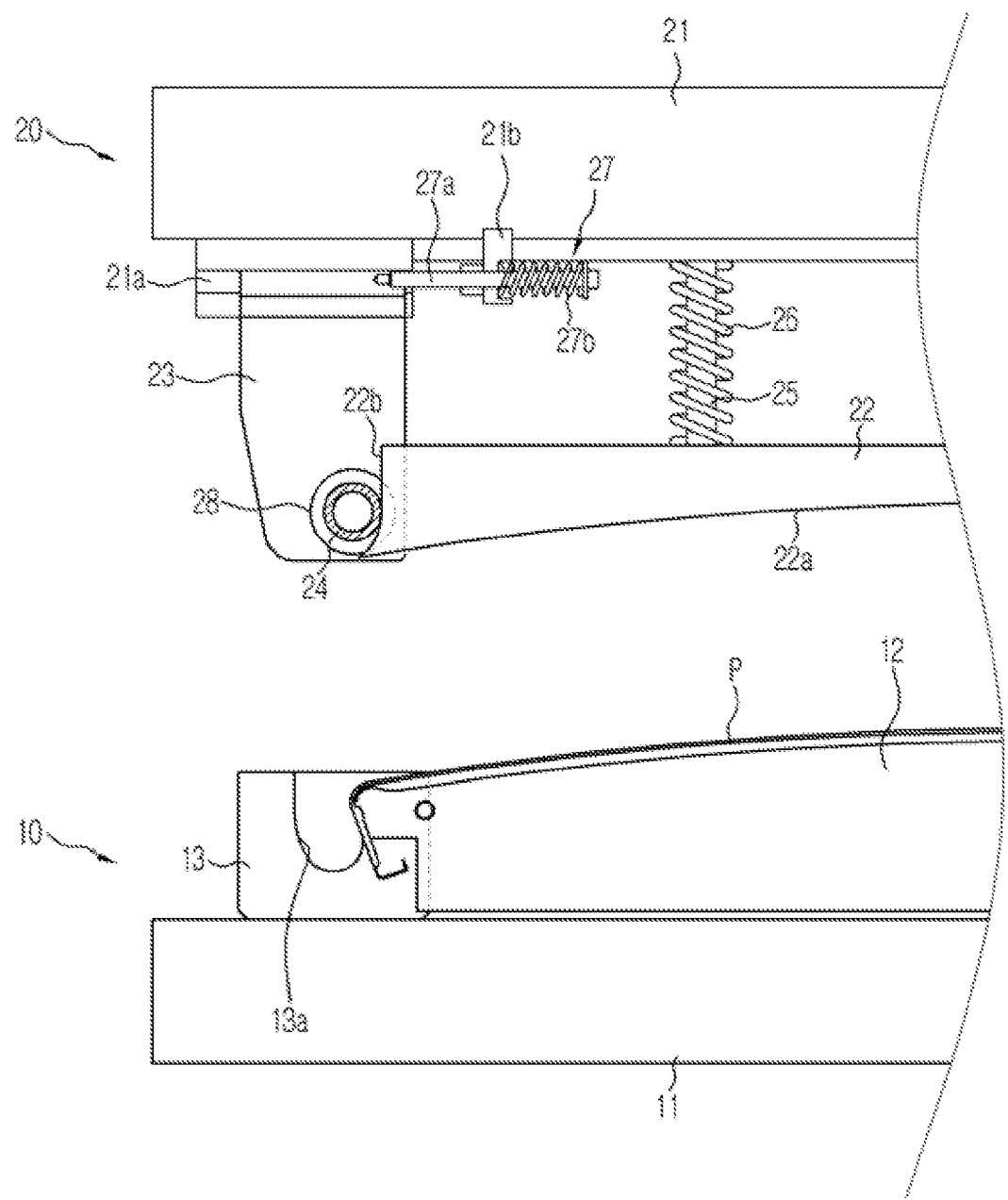

As shown in FIG. 6, when the bending shaft 24 moves along the side of the guide portion 22b to reach the side of the side surface forming portion 12b, the bending shaft 24 moves in the first horizontal direction by an elastic restoring force generated from the elastic support unit 27 which elastically supports the moving block 23 in the first horizontal direction. Since the bending shaft 24 is moved downwards while moving in the first horizontal direction to press the tip portion of the plate P against the side surface forming portion 12b, the tip portion of the plate P is deformed in the first horizontal direction.

Both ends of the bending shaft 24 enter into the guide grooves 13a provided in the guide blocks 13 while the bending shaft 24 moves along the side of the guide portion 22b. Both ends of the bending shaft 24 are guided so as to move along the trajectory corresponding to the guide portion 22b and side surface forming portion 12b by the guide grooves 13a. Thus, when the bending shaft 24 is guided by the guide grooves 13a, excessive force is prevented from being applied to the associated portion of the plate P while the bending shaft 24 moves a boundary between the guide portion 22b and side surface forming portion 12b.

In addition, as described above, since the side of the bending portion of the plate is supported by the guide roller 28 during deformation of the plate P, it may be possible to prevent creases of the plate P from being generated or protruding portions of the plate P from being generated.

After the plate P is completely bent, the upper die 20 is moved upwards to be spaced apart from the lower die 10 as shown in FIG. 6. Then, when the plate P is separated from the lower core 12, forming of the product is completed.

As is apparent from the above description, since a press die deforms a plate by pressing a portion of the plate against a side surface forming portion while a moving core moves in a horizontal direction depending on downward movement of an upper die, the plate may be deformed in the horizontal direction using the press die.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A press die comprising:
a lower die; and
an upper die disposed on an upper side of the lower die, wherein:
the lower die comprises a lower base resting on a stationary surface and a lower core on which a plate is loaded, the lower core having a lower surface forming portion corresponding to a lower surface of a product to be manufactured and a side surface forming portion corresponding to a side surface of the product to be manufactured; and
the upper die comprises an upper base, an upper core which comprises an upper surface forming portion corresponding to an upper surface of the product to be manufactured and is vertically movably installed to the upper base, a pair of moving blocks which is horizontally movably installed to the upper base, and a cylindrical bending shaft both end portions of which are installed to a lower portion of the pair of moving blocks, the cylindrical bending shaft pressing a portion of the plate against the side surface forming portion as the moving blocks move in a first horizontal direction.

2. The press die according to claim 1, wherein the cylindrical bending shaft is rotatably installed to the pair of moving blocks.

3. The press die according to claim 1, wherein the upper die further comprises an elastic support unit to elastically support each of the pair of moving blocks in the first horizontal direction.

4. The press die according to claim 3, wherein:
the upper base comprises a support member to mount the elastic support unit; and
the elastic support unit comprises a guide pin one end of which is provided with a head portion and the other end of which passes through the support member to be fixedly mounted to the moving block, and a transfer spring one end of which is supported by the support member and the other end of which is supported by the head portion.

5. The press die according to claim 3, wherein the upper core comprises a guide portion which forms a side surface thereof and guides the bending shaft such that the bending shaft moves in a second horizontal direction opposite to the first horizontal direction.

6. The press die according to claim 5, wherein:
the lower die comprises a pair of guide blocks to guide the bending shaft; and
each of the guide blocks comprises the side surface forming portion and a guide groove having a shape corresponding to the guide portion.

7. The press die according to claim 1, further comprising a pair of guide rollers disposed at both ends of the bending shaft, wherein the pair of guide rollers is disposed at both sides of the upper die so as to be spaced at an interval corresponding to a width of the plate.

8. The press die according to claim 7, wherein the pair of guide rollers is installed so as to be able to adjust a fixing position in an axial direction of the bending shaft.

9. The press die according to claim 6, wherein:
the upper core comprises a pair of guide portions which is symmetrically arranged at both sides thereof;
the lower core comprises a pair of side surface forming portions which is symmetrically arranged at both sides thereof;
the pair of moving blocks, the bending shaft, and the elastic support unit are symmetrically disposed at both sides about the upper core, respectively; and
the pair of guide blocks is symmetrically disposed at both sides about the lower core, respectively.

10. The press die according to claim 1, wherein the stationary surface is the ground.

11. A press die comprising:
a lower die; and
an upper die disposed on an upper side of the lower die, wherein:
the lower die comprises a lower base resting on a stationary surface and a lower core on which a plate is loaded, the lower core having a lower surface forming portion corresponding to a lower surface of an article to be manufactured and a side surface forming portion corresponding to a side surface of the article to be manufactured;
the upper die comprises an upper base, an upper core which comprises an upper surface forming portion corresponding to an upper surface of the article to be manufactured and is vertically movably installed to the upper base, a pair of moving blocks which is horizontally movably installed to the upper base, a pair of elastic support units to elastically support the pair of moving blocks in the first horizontal direction, and a cylindrical bending shaft both end portions of which are installed to a lower portion of the pair of moving blocks, the cylindrical bending shaft rotatably installed to the pair of moving blocks and pressing a portion of the plate against the side surface forming portion as the moving blocks move in a first horizontal direction;
the upper base comprises a pair of support members to mount the elastic support units; and
each elastic support unit comprises a guide pin one end of which is provided with a head portion and the other end of which passes through the support member to be fixedly mounted to the moving block, and a transfer spring one end of which is supported by the support member and the other end of which is supported by the head portion.

12. The press die according to claim 11, wherein the stationary surface is the ground.

* * * * *